United States Patent [19]

Teraoka

[11] 4,352,418

[45] Oct. 5, 1982

[54] HUB CLUTCH

[75] Inventor: Masao Teraoka, Sano, Japan

[73] Assignee: Tochigi-Fuji Sangyo Kabushiki Kaisha, Tochigi, Japan

[21] Appl. No.: 172,851

[22] Filed: Jul. 28, 1980

[30] Foreign Application Priority Data

Jun. 24, 1980 [JP] Japan .............................. 55-88453[U]

[51] Int. Cl.³ .............................................. F16D 11/10
[52] U.S. Cl. ................................... 192/36; 192/67 R; 192/54; 192/89 A; 192/93 A
[58] Field of Search ................ 192/89 A, 93 A, 67 R, 192/36, 35, 54; 74/337.5

[56] References Cited

U.S. PATENT DOCUMENTS

| | | |
|---|---|---|
| 2,915,158 | 12/1959 | Smith ................................ 192/36 X |
| 3,124,377 | 3/1964 | O'Brien et al. ................... 192/89 A |
| 3,217,847 | 11/1965 | Petrak .............................. 192/93 A X |
| 4,192,411 | 3/1980 | Fogelberg ........................ 192/36 |
| 4,269,294 | 5/1981 | Kelbel ............................. 192/93 A X |
| 4,281,749 | 8/1981 | Fogelberg ........................ 192/36 |
| 4,282,959 | 8/1981 | Schachner ....................... 192/35 |

*Primary Examiner*—George H. Krizmanich
*Attorney, Agent, or Firm*—Wenderoth, Lind & Ponack

[57] ABSTRACT

A hub clutch for wheels of a four-wheel drive vehicle need not be operated by the driver from the exterior of the vehicle. The hub clutch comprises a sleeve drive clutch member fixed to a drive shaft, a slide clutch member engaged to the drive clutch member through splines formed thereon and movable in the axial direction and a driven clutch member adapted to be connected to or disconnected from the slide clutch member by axial movement thereof. A retainer is engaged to a stationary system. Resilient means biases the slide clutch member in an axial direction of the drive shaft. A cam mechanism moves the slide clutch in the axial direction, thereby carrying out a clutch connection when relative rotation is present between the retainer and the slide clutch member, and releasing the clutch connection when the relative rotation becomes absent and a drive is provided from the driven clutch member side.

6 Claims, 8 Drawing Figures

HUB CLUTCH

BACKGROUND OF THE INVENTION

This invention relates to hub clutches and more particularly to a hub clutch for front wheels of a four-wheel drive vehicle, wherein there is no necessity for a driver of the vehicle operating the hub clutch from the exterior of the vehicle.

Normally such front wheels receive a driving force from a road surface during rear-wheel drive running periods. It is desirable during such periods that the front wheels be free-rolling when they are not being driven in order to reduce drag on the engine, to prevent rotation of the drive shafts, gears, etc. and to avoid unnecessary wear for improving running efficiency and fuel consumption. Therefore, it is required to provide an apparatus or hub clutch for preventing transfer of the driving force from the road surface to the components back to the front wheels.

The hub clutch developed for such a demand includes, for example, the following:

FIG. 1 is a schematic sectional view of the hub clutch which is disclosed in my pending application, U.S. Ser. No. 968,356. This hub clutch has features in that a shaft portion 112a of a bolt 112 to secure a case 110 to a wheel hub 111 is partially exposed on the inner surface of the case 110. The exposed shaft portion 112a is slidably engaged a groove 114 formed on the outer periphery of a driven clutch 113 adapted to be coupled with a drive clutch 115. The torque of the driven clutch 113 is directly transferred to the bolt 112 and then to the wheel hub 111 through the bolt 112. According to this invention, it is unnecessary to give a torque transfer function to the case itself and consequently, it is possible to use a lower strength and lighter weight material such as a light alloy for a case 110. This results in the light weight hub clutch. Since it is also not necessary to form a spline on the inner periphery on the case 110, the case easily may be manufactured in fewer process operations, and the driven clutch 113 has a space with a larger inner diameter so that it is easy to install other parts therein and the hub clutch is smaller in size.

However, this prior hub clutch has a disadvantage that an operator must get off the vehicle to switch a selecting lever 120 by a manual operation upon the clutch on-off operation, i.e., the switchover from four-wheel drive to two-wheel drive or vice versa.

FIG. 2A is a partly sectional fragementary elevation view of a hub clutch disclosed in U.S. Pat. No. 2,884,101. FIG. 2B is a cross-sectional view taken of line A—A of FIG. 2A. This clutch comprises a polygonal sleeve or cylindrical cam 220 fitted to a drive shaft 212, a cylindrical case 228 disposed radially outwardly of the cam 220 and fixed to a hub 217 by means of bolt 276, a plurality of rollers 224 disposed between the cam 220 and the case 228 and positioned in a retainer or roller cage 226 at equal intervals therearound, and a spring 234.

Unless external force is applied to the retainer clockwise or counterclockwise, a weak contact situation is maintained by means of the spring and power transmission is not effected. By switching a selecting lever from a two-wheel drive side over to a four-wheel drive side, the drive shaft, i.e., the cam, is rotated, the retainer is not rotated because an auxiliary friction member contacts with a stationary system, and the roller is wedged in between the cam and case, thereby power transmission is carried out. When the selecting lever is changed over to return to the two-wheel drive side, the retainer is returned to the original position due to no rotation of the drive shaft, thereby cutting off power transmission. In this way, this hub clutch accomplishes a changeover operation thereof by shifting a relative position between the cam and the retainer to move the rollers, and therefore the connection and disconnection of the hub clutch can be easily and surely achieved.

In this prior hub clutch referred to as automatic, therehave been observed several disadvantages as follows:

(1) an engine brake may fail to work, and thus upon off-load running, a driver must get off the vehicle and turn a manually operating selective lever 270 to lock it for working the engine brake; (2) the structures including the locking mechanism are very complicated; (3) it is not durable and heavy.

SUMMARY OF THE INVENTION

It is therefore an object of the present invention to provide a hub clutch for wheels of a four-wheel drive vehicle wherein there is no need for a driver to get off the vehicle for switchover of a selecting lever.

It is another object of the present invention to provide a hub clutch for wheels of a four-wheel drive vehicle which can transmit torque in either direction, such as for engine braking and the like.

Still another object of the present invention is to provide a hub clutch for wheels of a four-wheel drive vehicle which is simple in construction and light in weight, and is excellent in durability and reliability of operation.

According to the present invention, a hub clutch for providing the torque connection between a power shaft and a wheel hub of a four-wheel drive vehicle comprises a sleeve drive clutch member fixed to a drive shaft, a slide clutch member disposed radially outward of the drive clutch member, engaged to the drive clutch through splines formed thereon, and movable in an axial direction of the drive shaft, and a driven clutch member disposed radially outward of the slide clutch member, connected to or disconnected from the slide clutch member by the axial movement thereof. A retainer is engaged to a stationary system with a predetermined braking pressure. A resilient means biases the slide clutch member in an axial direction of the driven shaft. A cam mechanism moves the slide clutch toward member in the axial direction thereby carrying out a clutch connection when a relative rotation is present between the retainer and the slide clutch member, and releasing the clutch connection when the relative rotation become absent and the drive is provided from the driven clutch member side.

BRIEF DESCRIPTION OF THE DRAWINGS

The above and other objects, advantages and features of the present invention will appear from the following description taken in conjunction with the accompanying drawings, in which.

DESCRIPTION OF THE PREFERRED EMBODIMENTS

Figure 1:
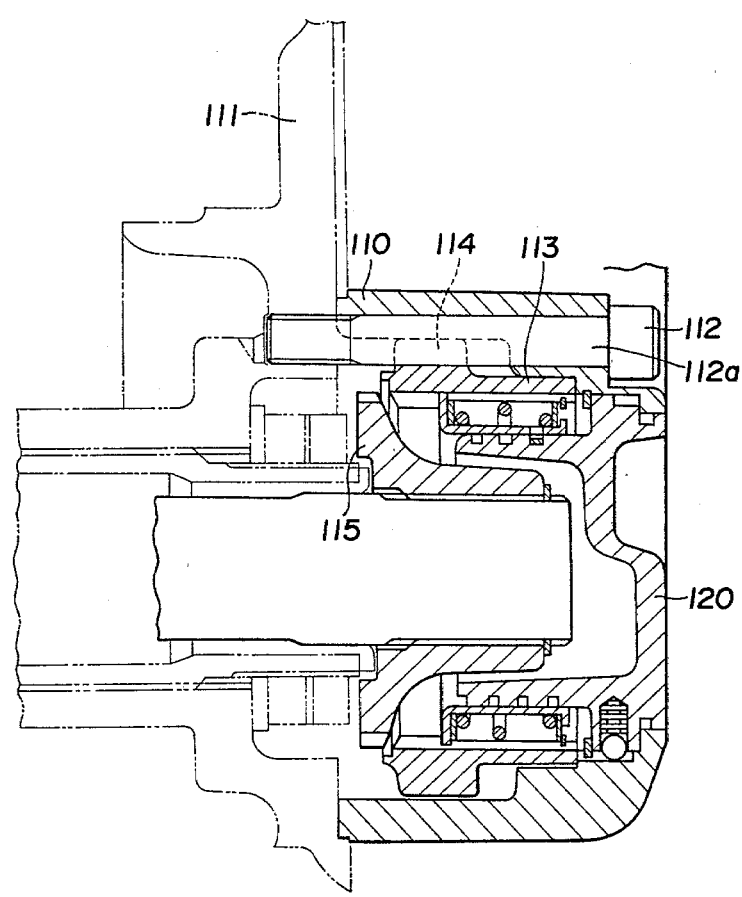
FIG. 1 is a longitudinal sectional view illustrating a hub clutch according to the prior art.
Figures 2A, 2B:
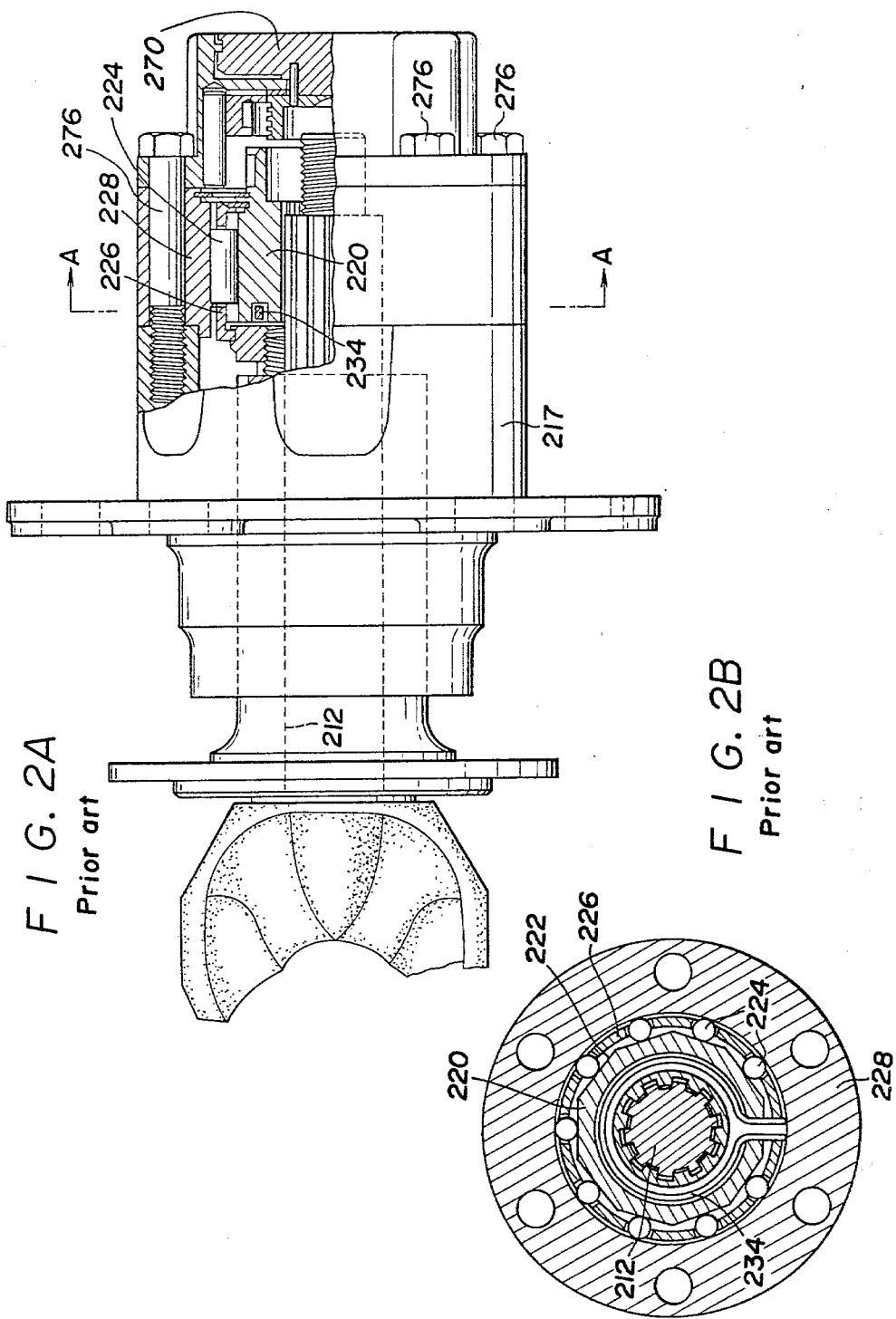
FIG. 2A is a partly sectional fragmentary elevation view of a hub clutch according to another prior art arrangement.
FIG. 2B is a cross-sectional view taken on line A—A of FIG. 2A.
Figure 3A:
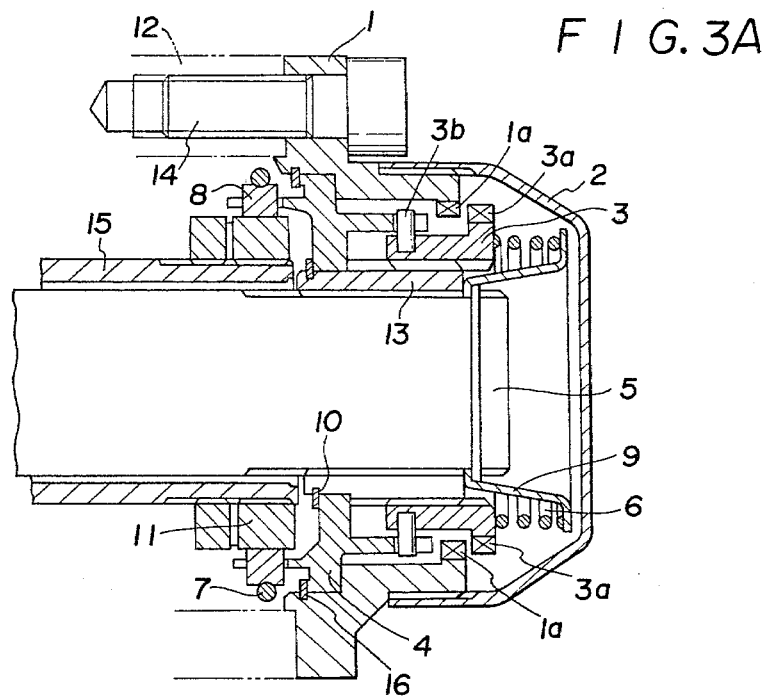
FIG. 3A is a longitudinal sectional view illustrating an embodiment of the present invention in the disconnected condition of the hub clutch.

Referring now to FIG. 3A, there is shown a hub clutch in its disconnected condition according to the present invention. In FIG. 3A, a sleeve drive clutch member 13 disposed within a cover 2 and fixed to a drive shaft 5 is engaged with a slide clutch member 3 through slines forned thereon. Slide clutch member 3 is axially moveable, is disposed radially outward of the drive clutch member 13, and has coupling teeth 3a formed on its outer periphery. A driven clutch member 1 disposed radially outward of the slide clutch member 3 has coupling teeth 1a, adapted to be connected to or disconnected from the teeth 3a of the slide clutch member 3 by axial movement of slide clutch member 3, on its inner periphery, and the outer peripheral portion of the driven clutch member 1 is fixed to a wheel hub 12 by means of a plurality of bolts 14. The slide clutch 3 has a pin member 3b, which is a follower, tightly fitted therein.

On a nonrotatable stationary cylindrical shaft 15 disposed radially outward of the drive shaft 5, a brake 8 to retard the rotation of a retainer 4 is mounted slidably in a rotational direction through a nut 11. Numeral 7 represents a garter spring for braking. Brake 8, upon retarding rotation of retainer 4, creates a limited relative rotation between slide clutch member 3 and retainer 4.

Figure 4A:
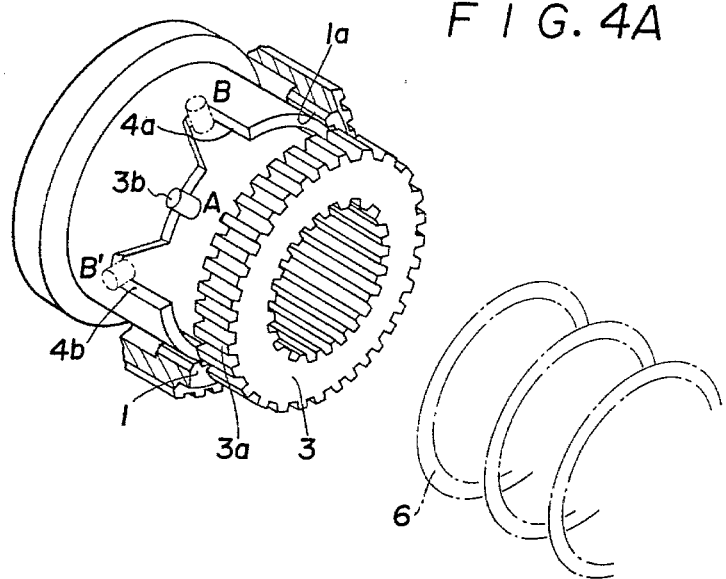
FIGS. 4A and 4B are a perspective view and a diagramatic explanatory view of the cam means shown in FIGS. 3A and 3B, respectively.
Figure 4B:
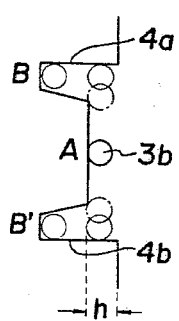

In FIG. 3A, a cam portion integral with the retainer 4 and projected rightward in the drawing is formed so that it imparts to the slide clutch member 3 a sliding motion in the axial direction. This retainer 4 has a cam surface such a contoured surface as shown in FIGS. 4A and 4B, that defines the sliding motion of the slide clutch member 3 through the pin member 3b fitted therein. The middle portion of the cam surface is positioned at a right angle to the drive shaft 5, and the cam surface is axially convex at its ends so as to limit the end positions of pin member 3b. The pin 3b tightly fitted into the slide clutch member 3 is adapted to be moved on the cam surface. As shown in FIG. 4B, opposite end stopper portions 4a and 4b of the cam surface extend axially more than the middle portion by distance h in the axial direction so as to stop the cam action of the pin 3b.

Figure 3B:
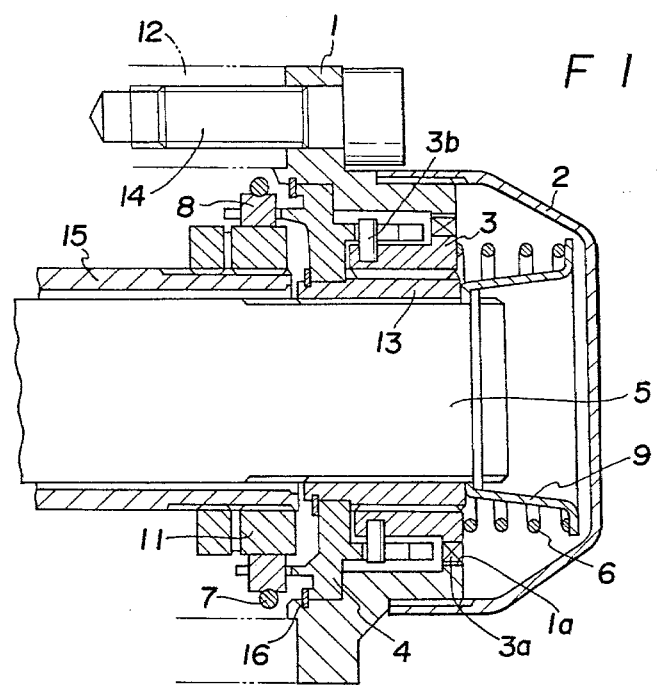
FIG. 3B shows the connected condition of the hub clutch shown in FIG. 3A.

In the clutch-on condition shown in FIG. 3B, the pin 3b is situated in an end position B or B'. In this condition, the slide clutch member 3 is situated in at an innermost end of an axially moving path, and thus it is engaged with the driven clutch member 1. This is a four-wheel drive situation.

As described above, the slide clutch member 3 rotates with the rotation of the drive shaft 5 and the drive clutch member 13. At the position B or B' of the pin 3b is obtained a clutch connection of engagement (refer to FIG. 3B), and at the position A (refer to FIG. 3A) clutch engagement is released. Numerals 10 and 16 represent snap rings.

As shown in FIG. 3B, the slide clutch member 3 which is to be guided leftward by means of the pin 3b moving on the cam surface described above, is pushed leftward by a coil spring 6 disposed on the right side thereof to engage with the coupling teeth 1a of the driven clutch member 1.

Figure 5:
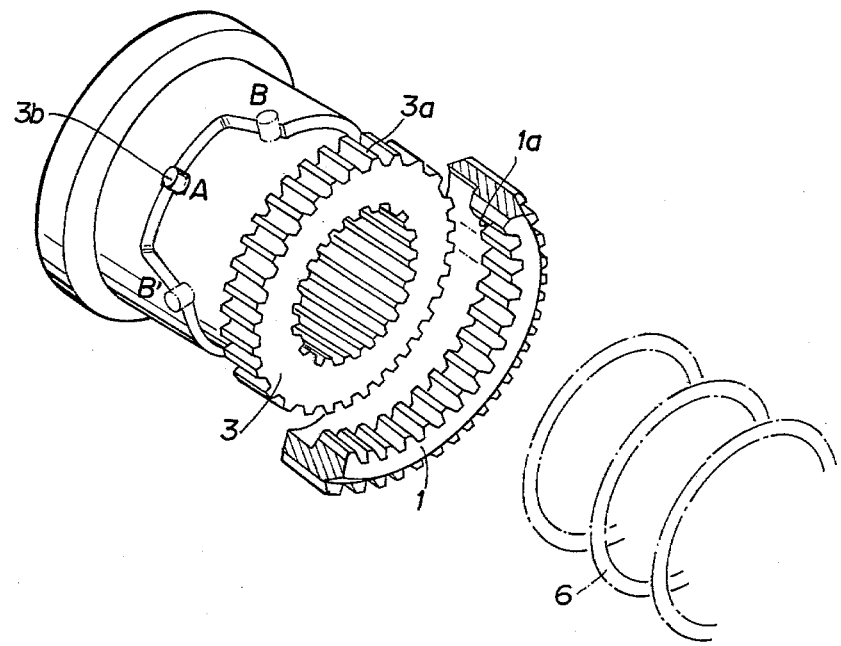
FIG. 5 is a perspective view of the cam means according to another embodiment of the present invention.

FIG. 5 shows another preferred embodiment of the hub clutch according to the present invention, illustrating a case in which the direction of the cam surface shown in FIG. 4A is reversed, i.e., the middle portion of the cam surface is axially concave. In this case, the hub clutch has a structure in which the slide clutch member 3 is connected to the driven clutch member 1 by the force produced by the cam mechanism, and such connection is released by the force of the spring 6.

An operation of the hub clutch disclosed above will hereinafter be described.

OPERATION (1) Upon Switchover to Four-Wheel Drive

Referring to FIG. 3A, when switching a selecting lever (not shown, arranged in a suitable place adjacent a driver's seat) over to a four-wheel drive situation, when the drive shaft 5 is rotated, both the drive clutch member 13 and the slide clutch member 3 are rotated along with the drive shaft 5. On the other hand, rotation of the retainer 4 is retarded. Consequently, a relative rotation is produced between the pin or follower 3b tightly fitted into the slide clutch member 3 and the cam surface convexly contoured in the retainer 4 until the pin 3b comes into contact with a stopper portion 4a or 4b of the cam surface, i.e., the pin 3b is moved from the position of A to B position or B'. In addition, the slide clutch member 3 is pushed and moved leftward in the drawing by the coil spring 6 to engage with the coupling teeth 1a of the driven clutch member 1. Thus, torque is transmitted from the drive shaft 5 to the driven clutch member 1, resulting in a four-wheel drive situation.

(2) Upon Switchover to Two-Wheel Drive

Referring to FIG. 3B, the above mentioned selecting lever is switched from the four-wheel drive situation to a two-wheel drive situation, first to intercept the power to the drive shaft 5, i.e. to a non-driving mode thereof, and then to permit the driven clutch member 1 to rotate in a direction opposite to the direction of previous movement (the latter operation can be achieved by permitting the vehicle to move just a short distance in the direction opposite to the direction which it has previously so far advanced). Since the retainer (cam) 4 can not rotate due to resistance of the brake 8, the pin or follower 3b is moved on the inclined cam surface from the position B or B' toward the position A, as shown in FIG. 4A. Consequently, the slide clutch member 3 moves rightward in FIG. 3A while compressing the coil spring 6, resulting in disengagement of the slide clutch member 3 from the driven clutch 1. When disengagement takes place, the rotation of the drive shaft 5, drive clutch member 13 and slide clutch member 3 will be stopped due to the rotation resistance of the drive shaft 5, and only the driven clutch member will run idle, thereby resulting in a two-wheel drive situation.

Furthermore, in the case of the axially concaved cam surface as shown in FIG. 5, the above descriptions are reversed, that is, the slide clutch member 3 is connected to the driven clutch 1 by the force provided by the cam, thereby obtaining a four-wheel drive situation, and such connection is released by the force of the coil spring 6, thereby obtaining a two-wheel drive situation.

Although the present invention has been described with reference to a preferred embodiment thereof, many modifications and alterations may be made within the spirit and scope of the present invention.

What is claimed is:

1. A hub clutch for use in a wheel drive assembly of a four-wheel drive vehicle, the assembly being of the type including a drive shaft selectively operable in a driving mode and rotating to transmit a rotational driving force and in a non-driving mode to interrupt such rotational driving force, and a hub positively driven when the drive shaft is in the driving mode thereof and freely rotatable when the drive shaft is in the non-driving mode thereof, said hub clutch comprising:

a sleeve drive clutch member adapted to be fixed to a drive shaft to rotate therewith during the driving mode thereof;

a driven clutch member positioned radially outwardly of said drive clutch member and adapted to be fixed to a hub, said driven clutch member including a single set of circumferentially spaced first teeth;

a slide clutch member positioned radially between said drive clutch member and said driven clutch member, said slide clutch member including a set of circumferentially spaced second teeth, said slide clutch member being mounted on said drive clutch member for rotation therewith and for axial movement relative thereto between an engaged first position whereat said second teeth are in engagement with said first teeth, thereby to transmit rotation of said drive clutch member to said driven clutch member, and a disengaged second position whereat said second teeth are out of engagement with said first teeth;

a retainer mounted about said drive clutch member for rotation with said slide clutch member and adapted to be mounted on a nonrotatable portion of the assembly, the axial position of said retainer with respect to said drive clutch member being fixed;

brake means for applying a predetermined braking pressure to said retainer, thereby for retarding rotation of said retainer and creating a limited relative rotation between said slide clutch member and said retainer;

resilient means for biasing said slide clutch member to move axially of said drive clutch member in a first direction; and cam means associated with said slide clutch member and said retainer for, upon rotation being imparted to said slide clutch member by one of said drive clutch member or said driven clutch member and the operation of said brake means to create said limited relative rotation between said slid clutch member and said retainer, allowing axial movement of said slide clutch member in said first direction, and for, upon rotation being imparted to said slide clutch member by the other of said driven clutch member or said driven clutch member and the operation of said brake means to create said limited relative rotation between said slide clutch member and said retainer, moving said slide clutch member axially in a second direction against the force of said resilient means, said axial movement of said slide clutch member in said first direction being from one of said first or second positions to the other of said first or second positions, and said axial movement in said second direction being from said other of said first or second positions to said one of said first or second positions, said cam means comprising a contoured cam surface formed on one of said retainer or said slide clutch member and a pin member fixed to the other of said retainer or said slide clutch member, said pin member being biased into contact with said contoured cam surface by said resilient means, such that upon said limited relative rotation between said slide clutch member and said retainer said pin member follows the contour of said cam surface, thereby achieving axial movement of said slide clutch member.

2. A hub clutch as claimed in claim 1, wherein said contoured cam surface is formed on said retainer, and said pin member is fixed to said slide clutch member.

3. A hub clutch as claimed in claim 2, wherein said contoured cam surface is convex axially outwardly of said drive clutch member and includes a middle portion contacted by said pin member to maintain said slide member in said disengaged second position, and opposite end portions extending inwardly from said middle portion away from said slide clutch member, said end portions allowing said axial movement of said slide clutch member in said first direction to said engaged first position upon rotation being imparted to said slide clutch member by said drive clutch member, and said end portions moving said slide clutch member axially in said second direction against the force of said resilient member to said disengaged second position upon rotation being imparted to said slide clutch member by said driven clutch member.

4. A hub clutch as claimed in claim 2, wherein said contoured cam surface is concave axially outwardly of said drive clutch member and includes a middle portion contacted by said pin member to maintain said slide clutch member in said disengaged second position, and opposite end portions extending outwardly from said middle portion toward said slide clutch member, said end portions allowing said axial movement of said slide clutch member in said first axial direction to said disengaged second position upon rotation being imparted to said slide clutch member by said driven clutch member, and said end portions moving said slide clutch member axially in said second direction against the force of said resilient member to said engaged first position upon rotation being imparted to said slide clutch member by said drive clutch member.

5. A hub clutch as claimed in claim 1, wherein said resilient means comprises a single coil spring.

6. A hub clutch as claimed in claim 1, wherein said brake means comprises a brake shoe adapted to engage the nonrotatable portion of the assembly and a garter spring urging said brake shoe toward the nonrotatable portion.

* * * * *